(12) United States Patent
Nilsson et al.

(10) Patent No.: US 11,508,181 B2
(45) Date of Patent: Nov. 22, 2022

(54) OPTICAL BIOMETRIC IMAGING DEVICE AND METHOD OF OPERATING AN OPTICAL BIOMETRIC IMAGING DEVICE

(71) Applicant: Fingerprint Cards AB, Gothenburg (SE)

(72) Inventors: René Nilsson, Eslöv (SE); Hans Martinsson, Gothenburg (SE); Arne Husth, Hellerup (DK)

(73) Assignee: FINGERPRINT CARDS ANACATUM IP AB, Gothenburg (SE)

(*) Notice: Subject to any disclaimer, the term of this patent is extended or adjusted under 35 U.S.C. 154(b) by 0 days.

(21) Appl. No.: 17/431,223

(22) PCT Filed: Dec. 17, 2019

(86) PCT No.: PCT/SE2019/051291
§ 371 (c)(1),
(2) Date: Aug. 16, 2021

(87) PCT Pub. No.: WO2020/171749
PCT Pub. Date: Aug. 27, 2020

(65) Prior Publication Data
US 2022/0130167 A1    Apr. 28, 2022

(30) Foreign Application Priority Data
Feb. 18, 2019   (SE) .................................... 1950199-8

(51) Int. Cl.
*G06V 40/13* (2022.01)
*G06V 40/12* (2022.01)
*G02B 3/00* (2006.01)

(52) U.S. Cl.
CPC ....... *G06V 40/1324* (2022.01); *G02B 3/0056* (2013.01); *G06V 40/1318* (2022.01); *G06V 40/1335* (2022.01)

(58) Field of Classification Search
None
See application file for complete search history.

(56) References Cited

U.S. PATENT DOCUMENTS

| 8,189,089 B1 | 5/2012 | Georgiev et al. |
| 2003/0234907 A1 | 12/2003 | Kawai |

(Continued)

FOREIGN PATENT DOCUMENTS

| EP | 2278529 A1 | 1/2011 |
| WO | 2018093798 A1 | 5/2018 |

OTHER PUBLICATIONS

Extended European Search Report dated Mar. 15, 2022 for EP Application No. 19916147.2, 6 pages.
(Continued)

*Primary Examiner* — Joseph R Haley
(74) *Attorney, Agent, or Firm* — RMCK Law Group, PLC

(57) ABSTRACT

Method for determining image reconstruction parameters in an optical biometric imaging device comprising a plurality of microlenses forming a microlens array and an image sensor arranged to receive light having passed through the microlenses, the method comprising: by the image sensor, capturing a plurality of sub-images together representing an image of a biometric object in contact with a sensing surface of the biometric imaging device, each sub-image corresponding to a respective microlens; and determining a demagnification factor based on at least a subset of the plurality of sub-images.

14 Claims, 5 Drawing Sheets

(56) References Cited

U.S. PATENT DOCUMENTS

| | | |
|---|---|---|
| 2010/0142770 A1 | 6/2010 | Hayasaka et al. |
| 2015/0268385 A1 | 9/2015 | Kobayashi et al. |
| 2018/0005005 A1 | 1/2018 | He et al. |
| 2018/0129798 A1 | 5/2018 | He et al. |
| 2020/0285345 A1* | 9/2020 | Xiang .................. G02B 3/0056 |

OTHER PUBLICATIONS

Szeliski, R., "Image Alignment and Stitching: A Tutuorial," Foundations and Trends In Computer Graphics and Vision, vol. 2, No. 1, Jan. 2007, 89 pages, https://www.microsoft.com/en-us/research/wp-content/uploads/2004/10/tr-2004-92.pdf.

PCT International Search Report and Written Opinion dated Feb. 6, 2020 for International Application No. PCT/SE2019/051291, 12 pages.

* cited by examiner

OPTICAL BIOMETRIC IMAGING DEVICE AND METHOD OF OPERATING AN OPTICAL BIOMETRIC IMAGING DEVICE

CROSS-REFERENCE TO RELATED APPLICATIONS

This application is a 371 U.S. National Stage of International Application No. PCT/SE2019/051291, filed Dec. 17, 2019, which claims priority to Swedish Patent Application No. 1950199-8, filed Feb. 18, 2019. The disclosures of each of the above applications are incorporated herein by reference in their entirety.

FIELD OF THE INVENTION

The present invention relates to a method for determining image reconstruction parameters in an optical biometric imaging device.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

There is also a desire to integrate fingerprint sensors in the display panel of a user device such as a smartphone in order to achieve "in-display" fingerprint sensing over a larger part of the display area. Optical fingerprint sensors in particular have shown promise for display integration where an optical fingerprint sensor can be arranged underneath an least partially transparent display panel.

For optical fingerprint imaging, the distance between the lenses of the sensor and the object to be imaged, i.e. the object distance, influences the image properties and an optical sensor it typically calibrated to operated properly for a certain object distance. The calibration of the optical sensor is often performed during production using a calibration target such as a bar target.

It may also be desirable to calibrate the optical sensor once the device is in use to account for changes in the object distance which may arise from wear and tear of the device or from structural changes of the device in which the optical sensor is arranged. One situation in particular which may have a large influence on eh image properties of an optical sensor in a user device is if a screen protector is arranged over a display, in which case the object distance is changed significantly. Such a change may lead to a loss of resolution in a resulting image which is not possible to correct for. It would thus be desirable to perform a new calibration once a screen protector has been arranged on a display.

However, calibration using a dedicated calibration target is complicated and therefore not practical once a device has left the production facility and is in use. Moreover, it is not necessarily known when a new calibration is needed.

In view of the above, it is desirable to provide an improved approach for calibrating an optical biometric sensor.

SUMMARY

In view of above-mentioned and other drawbacks of the state of the art, it is an object of the present invention to provide a method for determining image reconstruction parameters in a biometric imaging sensor without the use of a specific calibration target.

According to a first aspect of the invention, there is provided a method for determining image reconstruction parameters in an optical biometric imaging device comprising a microlens array and an image sensor arranged to receive light having passed through the microlens array, the method comprising: by the image sensor, capturing a plurality of sub-images together representing an image of a biometric object in contact with a sensing surface of the biometric imaging device, each sub-image corresponding to a respective microlens, wherein sub-images corresponding to adjacent microlenses are partially overlapping; and determining a demagnification factor based on at least an overlap a subset of the plurality of sub-images.

In a biometric imaging device based on microlenses, the image sensor will capture a plurality of sub-images corresponding to the plurality of microlenses. When processing the captured images in order to form a composite image to be used for verification and/or authentication, the demagnification factor is used to describe the optical properties of the imaging device. The demagnification factor can be defined as a ratio between an object width and an image width where the object width is the width of an object located in the object plane and the image width is the width of that object in the image plane. The demagnification factor is thereby used as an important image reconstruction parameter for forming the composite image.

The present invention is based on the realization that a demagnification can be determined from the captured sub-images with sufficient accuracy for using in image reconstruction without performing calibration. In particular, the demagnification factor can be determined based on the partial overlap of adjacent sub-images. Accordingly, a change in object distance would be reflected by a corresponding change overlap between adjacent sub-images, which can be used to determine the demagnification factor where the updated demagnification factor can be used in image reconstruction. Thereby, calibration of the imaging device can be performed during normal image capture without the need for any specific calibration target.

An advantage of the described invention is that appropriate image reconstruction parameters can be derived when the physical distance between the microlenses and the object to be image has changed, and that accurate biometric imaging can be performed once the updated image reconstruction parameters are determined.

According to one embodiment of the invention, the method comprises: determining a spatial offset between two captured adjacent sub-images corresponding to two adjacent microlenses; and determining the demagnification factor based on the determined spatial offset.

According to one embodiment of the invention, determining a spatial offset comprises determining a cross correlation between the two captured adjacent sub-images.

According to one embodiment of the invention the method further comprises: selecting a subset of microlenses having the same demagnification factor; determining an X-dimension and an Y-dimension cross correlation vector for each pair of microlenses in the subset of microlenses; forming an average X-dimension and Y-dimension cross correlation vector from the determined cross correlation vectors; summing the X-dimension and Y-dimension cross correlation vector; and determining a spatial offset based on the summed cross correlation vector. In principle, the cross correlation vector may be defined in an arbitrary direction. However, it may be computationally advantageous to use the X- and Y-directions defined by pixels in the sub-image.

According to one embodiment of the invention, the method further comprises determining the demagnification factor based on the spatial offset and a known pitch between adjacent microlenses. Thereby, the demagnification factor can be determined independently of other image reconstruction parameters and without prior knowledge of the demagnification factor.

According to one embodiment of the invention, the method may comprise performing stitching to form a full image from a plurality of sub-images based on a predetermined demagnification factor and a known microlens pitch; determine a figure of merit for the full image based on a predetermined set of image properties; comparing the figure of merit with a predetermined figure of merit threshold value; and if the figure of merit is below the predetermined figure of merit threshold value, change the demagnification factor and determine a new figure of merit. The method thus uses a figure of merit using a known demagnification factor for a known object distance. This in turn requires that a demagnification factor is known, for example from a calibration performed during production.

According to one embodiment of the invention, the predetermined set of image properties is at least one of image contrast and frequency content. Accordingly, parameters which may objectively describe the quality of the image are used to determine the figure of merit. The figure of merit may be a composite based on different image properties and it is also possible to use different figures of merit for different image properties.

According to one embodiment of the invention the predetermined demagnification factor may be acquired using a calibration image target.

According to one embodiment of the invention, the method further comprises optimizing the demagnification factor by iteratively changing the demagnification and the quality radius to determine a maximum figure of merit.

According to one embodiment of the invention, the method may further comprise using the determined or optimized demagnification factor in an image reconstruction process to form an image to be used for biometric verification.

According to a second aspect of the invention, there is provided a biometric imaging device comprising: an image sensor; and a microlens array arranged to redirect light from a sensing surface of the imaging device towards the image sensor, wherein the image sensor is configured to capture a plurality of sub-images together representing an image of a biometric object in contact with the sensing surface, wherein sub-images corresponding to adjacent microlenses are partially overlapping, each sub-image corresponding to a respective microlens, and to determine a demagnification factor based on an overlap of at least a subset of the plurality of sub-images.

According to one embodiment of the invention, the imaging device is further configured to determine a spatial offset between two captured adjacent sub-images corresponding to two adjacent microlenses and determine the demagnification factor based on the determined spatial offset. Moreover, the microlenses may for example be arranged in the form of a hexagonal array.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging device and method for determining image reconstruction parameters according to the present invention are mainly described with reference to an optical fingerprint sensing device arranged under a display panel of an electronic device such as a smartphone. However, the imaging device may also be used to capture other biometric features, such as palmprints, and the imaging device may be integrated in a wide range of applications.

Figure 1:
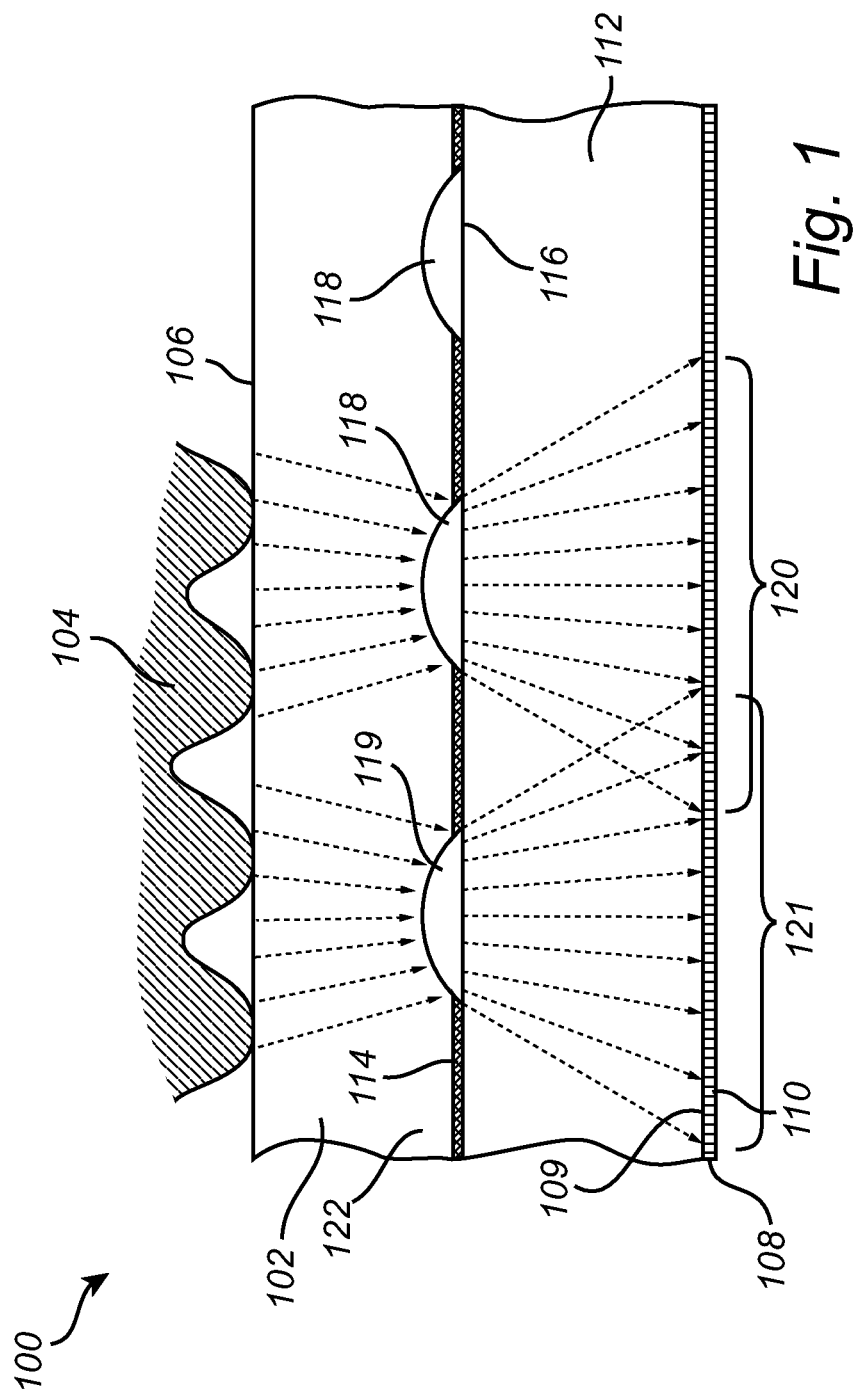
FIG. 1 schematically illustrates a biometric imaging device according to an embodiment of the invention.

FIG. 1 schematically illustrates a portion of a biometric imaging device 100 according to an embodiment of the invention. The biometric imaging device 100 is here arranged under an at least partially transparent display panel 102. However, the biometric imaging device 100 may be arranged under any cover structure which is sufficiently transparent, as long as the image sensor 108 receives a sufficient amount of light to capture an image of a biometric object in contact with the outer surface of the cover structure 102, such as a fingerprint or a palmprint. In the following, a biometric imaging device 100 configured to capture an image of a finger 104 in contact with an outer surface 106 of the display panel 102 will be described. The outer surface 106 will thereby be defined as a sensing surface 106.

The biometric imaging device 100 further comprises a transparent substrate 112 arranged to cover the image sensor 108, an opaque layer 114 covering an upper surface of the transparent substrate 112. The opaque layer 114 further comprises a plurality of separate openings 116, arranged at a distance from each other; and a plurality of microlenses 118 arranged in an array, such as a hexagonal or regular array. Each microlens 118 is here arranged in a respective opening 116 of the opaque layer 114 in the same plane as the opaque layer 114. Moreover, the microlens 118 has the same size and shape as the opening 116 to prevent any stray light which has not passed through the microlens 118 from reaching the image sensor 108.

In another embodiment the microlenses 118 may be arranged above the opaque layer 114, i.e. at a vertical distance from the opaque layer 114, with the focal point of the microlens 118 being located between the opaque layer 114 and the image sensor 108.

Each microlens 118 is configured to redirect light through the transparent substrate 112 and onto a subarray 120 of pixels in the photodetector pixel array 109. A subarray 120 is here defined as the array of pixels which receives light from a corresponding microlens 118. It can be seen that neighboring subarrays 120, 121 overlap, i.e. subarrays resulting from neighboring microlenses 118, 119. The overlap may be used to determine image reconstruction parameters as will be described in further detail in the following.

It should further be noted that the microlenses 118 and display pixels are not drawn to scale. The microlenses 118 receives light reflected by the finger 104 which has propagated through the display panel 102 before reaching the microlens 118, and the light received by the microlens 118 is focused onto the image sensor 108.

Figure 2:
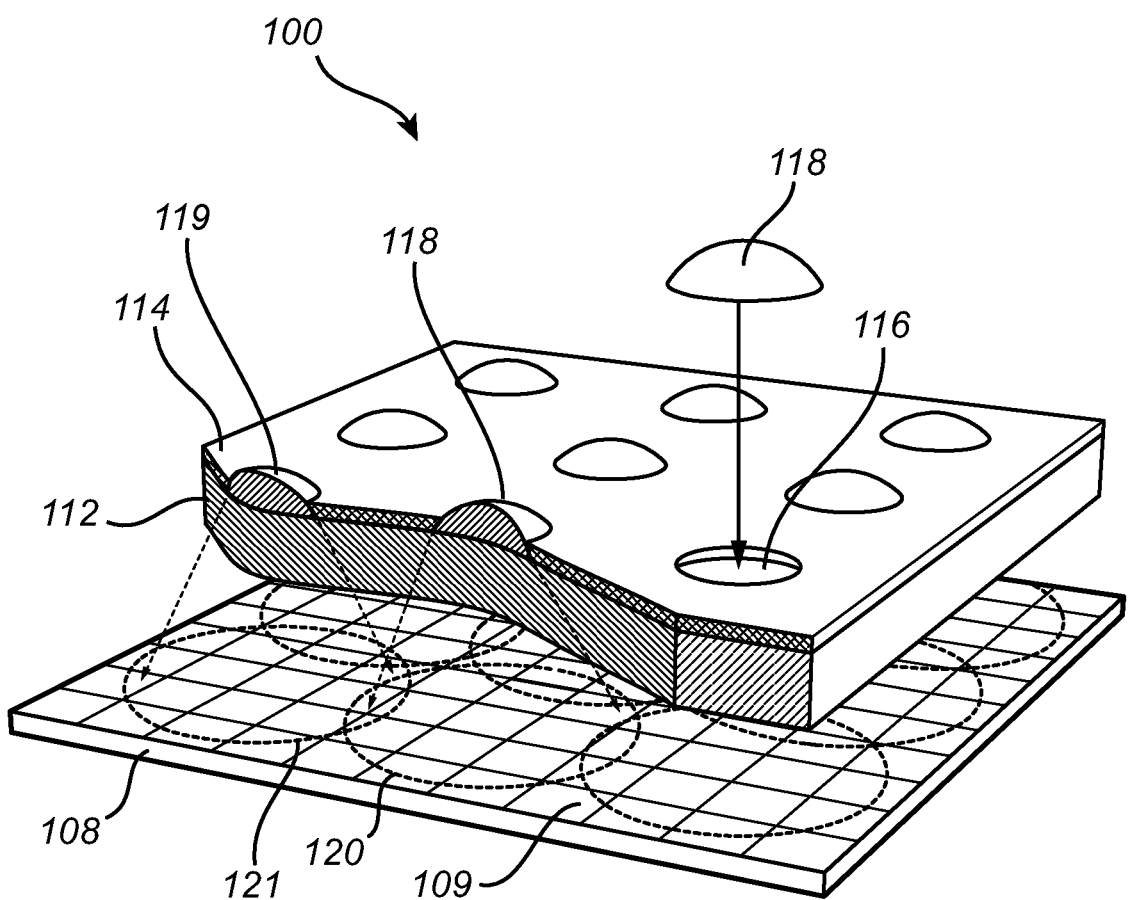
FIG. 2 is a method outlining the general steps of a method according to an embodiment of the invention.

FIG. 2 is an exploded view of the biometric imaging device 100 more clearly illustrating the subarrays 120, 121 of pixels in the pixel array 109 receiving light from one microlens 118. The microlenses 118 are here illustrated as circular plano-convex lenses, providing a circular subarray 120, 121 of pixels. It can be seen also in FIG. 2 that the sub-images from adjacent microlenses overlap. It would also be possible to use a rectangular microlens which would lead to an approximately rectangular subarray of pixels. The pitch of the microlenses 118 can be considered to be known with high accuracy. The pitch may also be different in in X- and Y-directions. All of the microlenses 118 within the microlens array are preferably of the same size and shape.

Each microlens 118 thus redirects light onto a pixel array 120 comprising a plurality of light sensing elements such that a sub-image is captured by the subarray 120 for the corresponding microlens 118. Each sub-image represents a portion of the fingerprint. The image analysis required to verify a fingerprint after image capture can be performed in many different ways and will not be discussed in detail herein.

Figure 3:
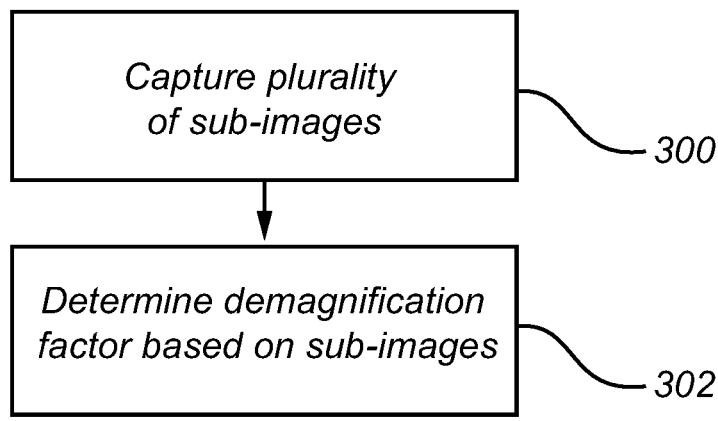
FIG. 3 is a flowchart outlining steps of a method according to various embodiments of the invention.

FIG. 3 is a flowchart outlining steps of a method according to various embodiments of the invention, and the method will be described with further reference to the biometric imaging device illustrated in FIGS. 1 and 2. The method may be performed by a control unit in the biometric imaging device or by a control unit of a device connected to the biometric imaging device. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The method comprises, by the image sensor 108, capturing 300 a plurality of sub-images 121, 122 together representing an image of a biometric object 104 in contact with a sensing surface 106 of the biometric imaging device 100, each sub-image corresponding to a respective microlens; and determining 302 a demagnification factor based on at least a subset of the plurality of sub-images. Capturing an image may be done by capturing an image using the full area of the image sensor, but it is also possible to capture an image using only a portion of the image sensor, such as a portion corresponding the location of the finger on the sensing surface.

Moreover, there are different ways to determine the demagnification factor based on the plurality of sub images as will be described in the following.

Figure 4:
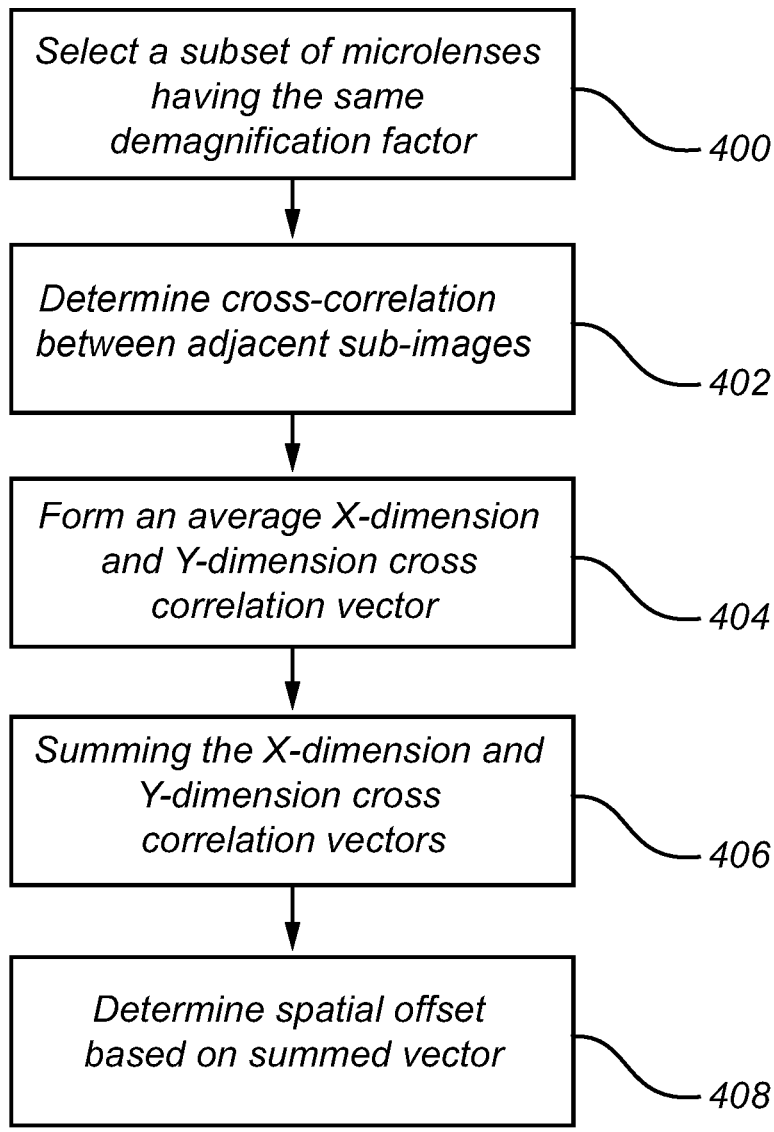
FIG. 4 is a flowchart outlining steps of a method according to various embodiments of the invention.

According to an embodiment outlined by the flowchart in FIG. 4, the biometric imaging device is configured so that sub-images 121, 122 corresponding to adjacent microlenses 118, 119 are partially overlapping as illustrated in FIGS. 1 and 2. The method comprises determining 408 a spatial offset between two captured adjacent sub-images corresponding to two adjacent microlenses; which can be done by determining a cross correlation between the two captured adjacent sub-images. To determine the cross correlation according to an example embodiment, it is assumed that the pitch between adjacent microlenses known both in the X-direction and in the y-direction. The microlens pitch is defined in the manufacturing process and can be determined with a high degree of accuracy. In the present context it can be assumed that the demagnification factor is constant for all microlenses, in practice meaning that the microlens array, the sensing surface 106 and the image sensor 108 are substantially planar and parallelly arranged. However, for a device where the mounting of the biometric imaging device underneath e.g. a display panel is tilted in relation to the surface of the display panel, the object distance may vary across the image sensor area. A tilted imaging device means that the demagnification varies linearly in X and Y directions. It is still possible to estimate the demagnification(s) of the microlens grid in a situation like this. In principle the demagnification factor can be estimated per each microlens pair and thus in practice per microlens.

First, a subset of microlenses having the same demagnification factor is selected 400. In practice, it is not necessary to use sub-images from all microlenses in the microlens array when determining the spatial offset, it is sufficient to use the microlenses which are located below the biometric object. Thereby it is sufficient that a subset of microlenses have the same demagnification factor.

Next, an X-dimension and a Y-dimension cross correlation vector for each pair of microlenses in the subset of microlenses is determined 402, and an average X-dimension and Y-dimension cross correlation vector is formed 404 from the determined cross correlation vectors, followed by summing 406 the X-dimension and Y-dimension cross correlation vectors.

However, if the microlens pitch in the X-dimension is different from the pitch in the Y-dimension, then the cross-correlation vectors cannot be summed right away. To make summation of X and Y cross correlation vectors possible, one of the vectors is either spatially compressed or spatially expanded so that both vectors match.

It may also be required to resample both the X and the Y cross-correlation vectors before addition. Furthermore, the subimages may be spatially filtered before the cross-correlations are calculated. The filters used depends on whether the subimages are used for X or Y dimension correlations. In the present application, spatial band-pass filtering is advantageously used to emphasize the spatial frequencies expected to belong to a fingerprint, as the fingerprint object is the useful signal.

Once the X and Y cross correlation vectors are summed, the spatial offset can be determined 408 based on the summed cross correlation vector, and the demagnification factor can be determined based on the determined spatial offset. In particular, the spatial offset is found as the maximum index of the correlation vector (fractional value is found by using an interpolation method). Once the spatial offset is found, the demagnification is determined 302 by dividing the microlens X pitch with the spatial offset.

An advantage of the above described method is that it can be used without any prior calibration. This means that the described method can be used also during the production stage for an initial factory-calibration, thereby eliminating the steps of performing a calibration using a calibration target. Accordingly, the manufacturing process can be simplified which is very important in large scale manufacturing. Moreover, the method can be automatically be applied when the object distance is changed, such as when a screen protector is attached to a smartphone.

Figure 5:
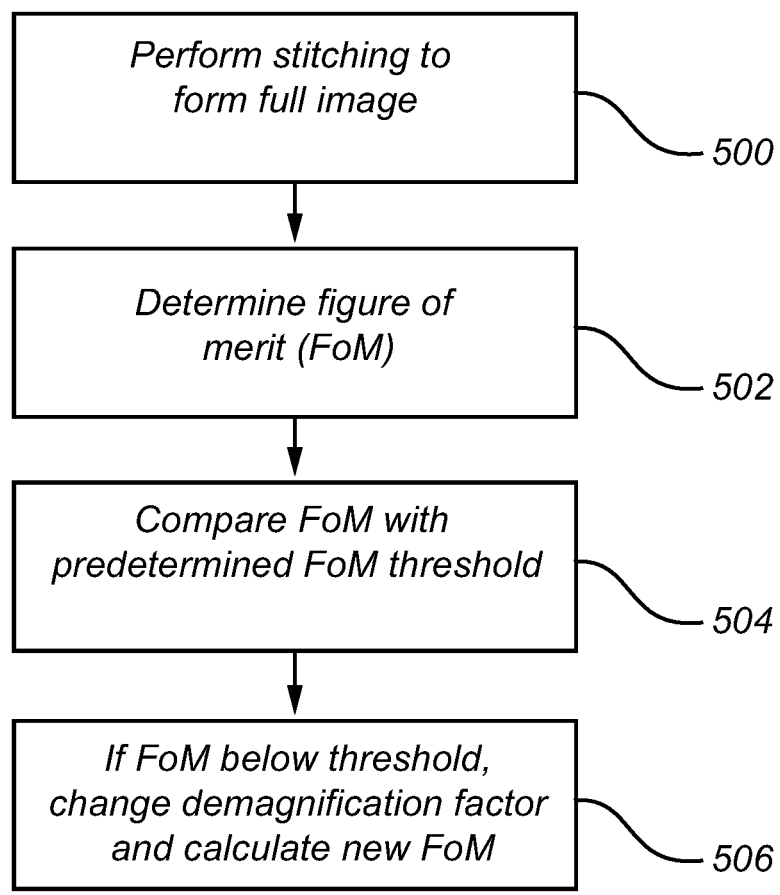
FIG. 5 is a flowchart outlining steps of a method according to various embodiments of the invention.

FIG. 5 is a flowchart outlining steps of a method according to various embodiments of the invention. The described method further comprises performing 500 stitching to form a full image from a plurality of sub-images based on a predetermined demagnification factor and a known microlens pitch. Accordingly, in this method a demagnification factor is needed along with the known microlens pitch. The demagnification factor may for example, be derived by a previous calibration either using the previously described method or from a calibration step during manufacturing using a calibration image target. It would also be possible to start from a default demagnification factor which is preset based on expected properties of the imaging device.

Next, a figure of merit is determined 502 for the full image based on a predetermined set of image properties, such as image contrast and/or frequency content. The figure of merit is intended to represent the quality of the image with respect to how well the image can be used for subsequent biometric identification. It should also be noted that the distinct and repetitive pattern of a biometric feature such as a fingerprint simplifies the determination of a figure of merit of the image since the desirable image properties of a fingerprint are well known.

Next, the figure of merit is compared 504 with a predetermined figure of merit threshold value. The figure of merit threshold value preferably represents an image quality where biometric identification can be performed with acceptable accuracy.

If the figure of merit is below the predetermined figure of merit threshold value, the demagnification factor is changed 506 and a new figure of merit is determined.

Accordingly, the method may be implemented as brute force method which comprises looping over a set of values of the demagnification factor and measure a figure of merit in the recombined image for each value of the demagnification factor followed by choosing the demagnification factor corresponding to the best figure of merit. The change may be done by iteratively changing the demagnification factor until a figure of merit above the threshold value is found.

Figure 6:
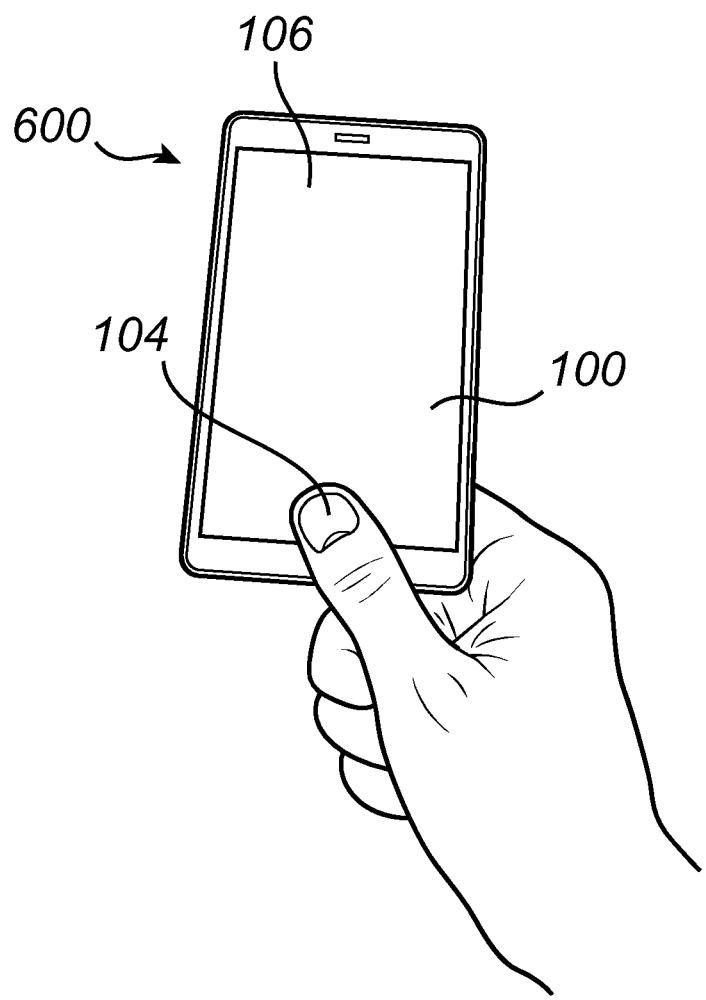
FIG. 6 schematically illustrates a smartphone comprising a biometric imaging device according to an embodiment of the invention.

FIG. 6 schematically illustrates a smartphone 600 comprising an optical biometric imaging device 102 integrated in the display panel of the smartphone 100. The optical biometric imaging device 102 is configured to capture an image of an object 104 in contact with an outer surface 106 of the biometric imaging device 102. The object 104 in contact with the outer surface 106 is here illustrated as a finger 104 in contact with the surface 106 of the display panel. In addition to fingerprints, the described device 102 may also be used to capture palmprints.

Even though the invention has been described with reference to specific exemplifying embodiments thereof, many different alterations, modifications and the like will become apparent for those skilled in the art. Also, it should be noted that parts of the method may be omitted, interchanged or arranged in various ways, the method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for determining image reconstruction parameters in an optical biometric imaging device comprising a plurality of microlenses forming a microlens array and an image sensor arranged to receive light having passed through the microlenses, the method comprising:
   by the image sensor, capturing a plurality of sub-images together representing an image of a biometric object in contact with a sensing surface of the biometric imaging device, each sub-image corresponding to a respective microlens, wherein sub-images corresponding to adjacent microlenses are partially overlapping; and
   determining a demagnification factor based on an overlap of at least a subset of the plurality of sub-images.

2. The method according to claim 1, wherein the method further comprises:
   determining a spatial offset between two captured adjacent sub-images corresponding to two adjacent microlenses; and
   determining the demagnification factor based on the determined spatial offset.

3. The method according to claim 2, wherein determining a spatial offset comprises determining a cross correlation between the two captured adjacent sub-images.

4. The method according to claim 3, wherein determining a spatial offset further comprises:
   selecting a subset of microlenses having the same demagnification factor;
   determining an X-dimension and an Y-dimension cross correlation vector for each pair of microlenses in the subset of microlenses;
   forming an average X-dimension and Y-dimension cross correlation vector from the determined cross correlation vectors;
   summing the X-dimension and Y-dimension cross correlation vectors; and
   determining a spatial offset based on the summed cross correlation vector.

5. The method according to claim 4, further comprising determining the demagnification factor based on the spatial offset and a known pitch between adjacent microlenses.

6. The method according to claim 1, further comprising:
   performing stitching to form a full image from a plurality of sub-images based on a predetermined demagnification factor and a known microlens pitch;

determining a figure of merit for the full image based on a predetermined set of image properties;

comparing the figure of merit with a predetermined figure of merit threshold value; and if the figure of merit is below the predetermined figure of merit threshold value, changing the demagnification factor and determining a new figure of merit.

7. The method according to claim 6, wherein the predetermined set of image properties is at least one of image contrast and frequency content.

8. The method according to claim 6, wherein the predetermined demagnification factor is acquired using a calibration image target.

9. The method according to claim 6, further comprising optimizing the demagnification factor by iteratively changing the demagnification to determine a maximum figure of merit.

10. The method according to claim 1, further comprising using the demagnification factor in an image reconstruction process to form an image to be used for biometric verification.

11. A biometric imaging device comprising:
an image sensor; and
a plurality of microlenses forming a microlens array arranged to redirect light from a sensing surface of the imaging device towards the image sensor, wherein the image sensor is configured to capture a plurality of sub-images together representing an image of a biometric object in contact with the sensing surface, wherein sub-images corresponding to adjacent microlenses are partially overlapping, each sub-image corresponding to a respective microlens, and to determine a demagnification factor based on an overlap of at least a subset of the plurality of sub-images.

12. The biometric imaging device according to claim 11, wherein the imaging device is further configured to determine a spatial offset between two captured adjacent sub-images corresponding to two adjacent microlenses and determine the demagnification factor based on the determined spatial offset.

13. The biometric imaging device according to claim 11, wherein the microlenses are arranged in the form of a hexagonal array.

14. An electronic user device comprising a biometric imaging device according to claim 11.

* * * * *